(12) United States Patent
Takano et al.

(10) Patent No.: US 6,266,965 B1
(45) Date of Patent: Jul. 31, 2001

(54) REFRIGERANT CYCLE SYSTEM HAVING HOT-GAS BYPASS STRUCTURE

(75) Inventors: Yoshiaki Takano, Kosai; Satoshi Izawa; Hajime Ito, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/591,735

(22) Filed: Jun. 12, 2000

(30) Foreign Application Priority Data

Jun. 29, 1999 (JP) .................................................. 11-183382

(51) Int. Cl.[7] .................................................... F25B 1/00
(52) U.S. Cl. ................................................ 62/126; 62/129
(58) Field of Search ............................... 62/125, 126, 127, 62/129, 130, 159, 160, 228.1, 228.3, 228.4, 196.4, 196.1

(56) References Cited

U.S. PATENT DOCUMENTS

| 4,220,010 | * | 9/1980 | Mueller et al. | 62/126 |
| 5,481,884 | * | 1/1996 | Scoccia | 62/129 |
| 5,586,445 | * | 12/1996 | Bessler | 62/126 |
| 6,098,412 | * | 8/2000 | Porter et al. | 62/129 X |
| 6,205,798 | * | 3/2001 | Porter et al. | 62/129 |

FOREIGN PATENT DOCUMENTS 5-272817    10/1993   (JP) .

* cited by examiner

*Primary Examiner*—Harry B. Tanner
(74) *Attorney, Agent, or Firm*—Harness, Dickey & Pierce, PLC

(57) ABSTRACT

In a refrigerant cycle system, a refrigerant discharge side of a compressor is directly connected to a refrigerant inlet side of an evaporator through a hot-gas bypass passage so that the evaporator is used as a radiator during a heating mode due to the hot-gas bypass. A physical amount of refrigerant, such as a high-pressure side refrigerant pressure, flowing through the hot-gas bypass passage is detected. When the high-pressure side refrigerant pressure is decreased to a value corresponding to a refrigerant shortage area, a refrigerant shortage is determined and the compressor is stopped by a control unit. Thus, during the heating mode due to the hot-gas bypass, when a refrigerant leakage is caused in the refrigerant cycle system, the compressor is accurately protected.

11 Claims, 7 Drawing Sheets

REFRIGERANT CYCLE SYSTEM HAVING HOT-GAS BYPASS STRUCTURE

CROSS-REFERENCE TO RELATED APPLICATION

This application is related to and claims priority from Japanese Patent Applications No. Hei. 11-183382 filed on Jun. 29, 1999, the contents of which are hereby incorporated by reference.

BACKGROUND OF THE INVENTION

1. Field of the Invention

The present invention relates to a refrigerant cycle system having a hot-gas bypass structure, in which hot gas refrigerant discharged from a compressor is directly introduced into an evaporator after being decompressed while bypassing a condenser during a heating mode. The refrigerant cycle system accurately determines a refrigerant shortage during the heating mode, and is suitable for a vehicle air conditioner.

2. Description of Related Art

In a conventional vehicle air conditioner, air blown into a passenger compartment is heated by using hot water (engine-cooling water) flowing through a heating heat exchanger as a heating source during a heating mode in the winter. In this case, when temperature of hot water is low, the temperature of air blown into the passenger compartment is lowered, and heating capacity for the passenger compartment becomes insufficient.

JP-A-5-272817 describes a refrigerant cycle system which can set a heating mode using a hot-gas refrigerant bypassing structure. In the conventional system, when temperature of hot water is lower than a predetermined temperature at an engine start time, hot-gas refrigerant discharged from a compressor is introduced into an evaporator while bypassing a condenser so that air passing through the evaporator is heated by heat from the gas refrigerant. That is, the operation of the refrigerant cycle system is switched so that the evaporator is used as a cooling unit during a cooling mode and is used as a heating unit during the heating mode.

However, in the conventional system, when a refrigerant amount within a hot gas bypass cycle is insufficient, refrigerant staying in the condenser is only recovered. Therefore, even when the refrigerant amount in the refrigerant cycle is greatly reduced due to a refrigerant leakage from a component or a pipe of the refrigerant cycle system, the operation of the compressor is continuously performed. Thus, in this case, the compressor may be damaged.

SUMMARY OF THE INVENTION

In view of the foregoing problems, it is an object of the present invention to provide a refrigerant cycle system having a hot-gas bypass structure, which protects a compressor even when a refrigerant leakage is caused during a heating mode.

According to the present invention, in a refrigerant cycle system, a hot-gas bypass passage through which refrigerant discharged from a compressor directly flows into a refrigerant inlet side of an evaporator is provided, so that the evaporator is used as a radiator during a heating mode due to the hot-gas bypass. The refrigerant cycle system includes a detecting unit for detecting a physical amount indicating a state of refrigerant flowing through the hot-gas bypass passage during the heating mode, and a control unit for controlling operation of the compressor. The control unit determines a refrigerant shortage based on the physical amount, and stops the operation of the compressor when the refrigerant shortage is determined. As a result, during the heating mode due to the hot-gas bypass, the compressor is accurately protected when a refrigerant leakage is caused in the refrigerant cycle system.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
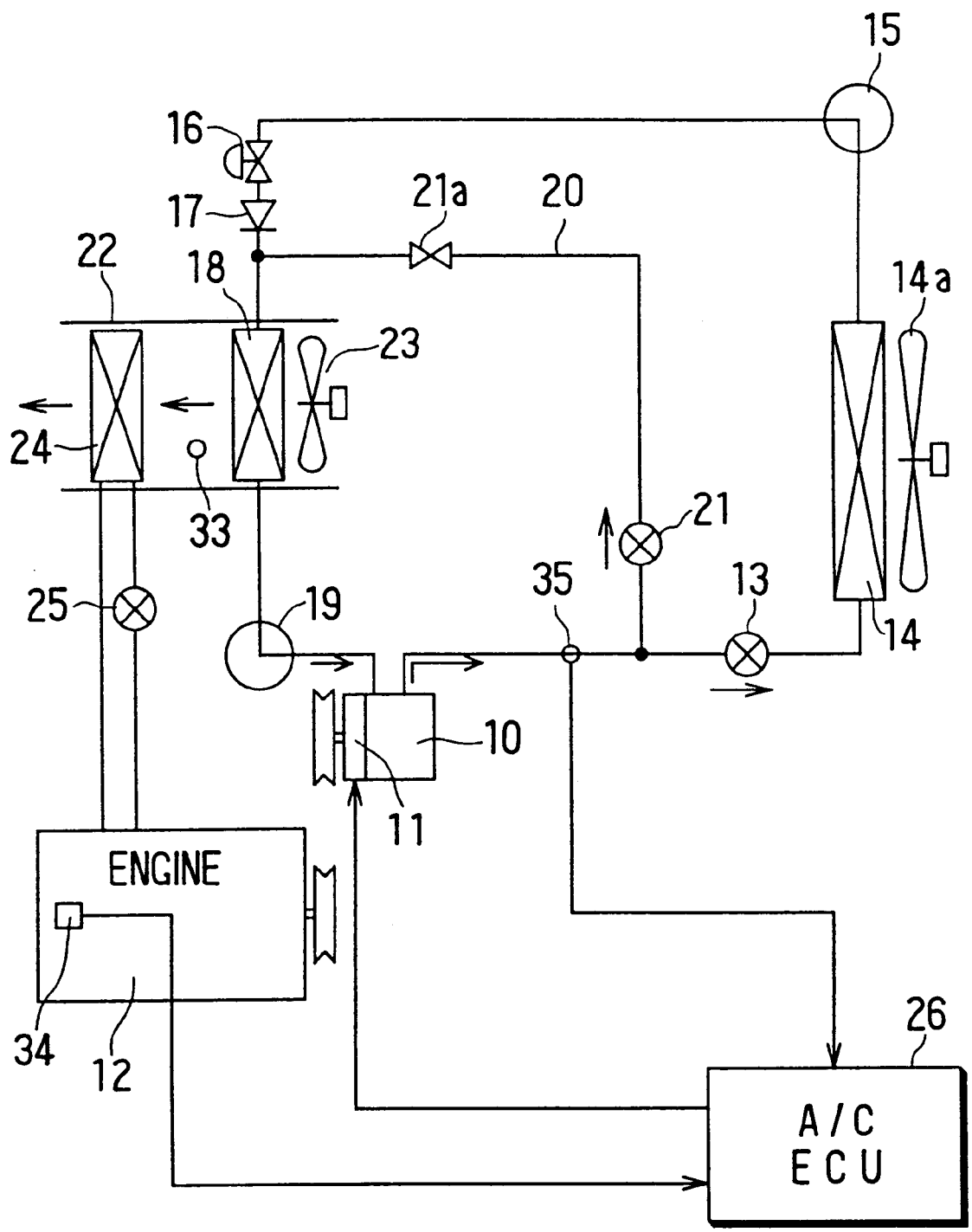
FIG. 1 is a schematic view showing a refrigerant cycle system according to a first preferred embodiment of the present invention.

Preferred embodiments of the present invention will be described hereinafter with reference to the accompanying drawings.

A first preferred embodiment of the present invention will be now described with reference to FIGS. 1–5. In the first embodiment, a refrigerant cycle system of the present invention is typically applied to a vehicle air conditioner. A compressor 10 of the refrigerant cycle system is driven by a vehicle engine 12 through an electromagnetic clutch 11. For example, the compressor is a turbo compressor of a fixed volume type.

A refrigerant discharge side of the compressor 10 is connected to a condenser 14 through a first electromagnetic valve 13, and a refrigerant outlet side of the condenser 14 is connected to a receiver 15 in which gas refrigerant and liquid refrigerant are separated from each other and liquid refrigerant is stored therein. The first electromagnetic valve 13 is used for a cooling mode of the refrigerant cycle system. Outside air outside a passenger compartment is blown by a cooling fan 14a toward a condenser 14 to be heat-exchanged with refrigerant in the condenser 14.

A refrigerant outlet side of the receiver 15 is connected to a thermal expansion valve (i.e., first decompression unit) 16, and a refrigerant outlet side of the thermal expansion valve 16 is connected to an evaporator 18 through a check valve 17. Further, a refrigerant outlet side of the evaporator 18 is connected to a refrigerant suction side of the compressor 10 through an accumulator 19.

In the thermal expansion valve 16, a valve opening degree (i.e., refrigerant flow amount) is adjusted so that a superheating degree of refrigerant at an outlet of the evaporator 18 is maintained at a predetermined degree during a normal operation (i.e., cooling mode) of the refrigerant cycle system. In the accumulator 19, gas refrigerant and liquid refrigerant are separated, so that liquid refrigerant is stored therein, and gas refrigerant and a little liquid refrigerant containing oil are sucked into a refrigerant suction side of the compressor 10.

On the other hand, between the refrigerant discharge side of the compressor 10 and the refrigerant inlet side of the evaporator 18, a hot-gas bypass passage 20 through which hot gas refrigerant discharged from the compressor 10 bypasses the condenser 14 and the other components is provided. A second electromagnetic valve 21 and a throttle (i.e., second decompression unit) 21a are provided in series in the hot-gas bypass passage 20. In the first embodiment, the throttle 21a is a fixed throttle such as an orifice and a capillary.

The evaporator 18 is disposed in an air conditioning case 22 of the vehicle air conditioner. Therefore, air blown by an electrical blower 23 is heat-exchanged with refrigerant flowing through the evaporator 18. During the cooling mode of the refrigerant cycle system, refrigerant in the evaporator 18 absorbs heat from air so that air passing through the evaporator 18 is cooled. On the other hand, during the heating mode of the refrigerant cycle system, hot gas refrigerant having a high temperature from the compressor 10 flows into the evaporator 18 through the hot-gas bypass passage 20 so that air passing through the evaporator 18 is heated. During the heating mode of the refrigerant cycle system, the evaporator 18 is used as a radiator.

A heating heat exchanger 24 for heating air is disposed in the air conditioning case 22 at a downstream air side of the evaporator 18. Hot water from the vehicle engine 12 is introduced into the heating heat exchanger 24 so that air passing through the heating heat exchanger 24 is heated using hot water from the vehicle engine 12 as a heating source. Air from the heating heat exchanger 24 is blown into the passenger compartment through air outlets at downstream air sides of the heating heat exchanger 24. A water valve 25 for controlling a flow amount of hot water flowing into the heating heat exchanger 24 is disposed in a hot water circuit of the vehicle engine 12.

In the first embodiment; during the heating mode of the refrigerant cycle system, the heating heat exchanger 24 is used as a main heating unit, and the evaporator 18 is used as a supplementary heating unit.

The components of the vehicle air conditioner are controlled by an air-conditioning electronic control unit (ECU) 26. The ECU 26 includes a micro-computer and circuits around the micro-computer. The ECU 26 performs calculations in accordance with predetermined programs based on input signals, and controls operations of the electromagnetic clutch 11, the first and second electromagnetic valves 13, 21 and the other components (e.g., 14a, 23, 25).

Figure 2:
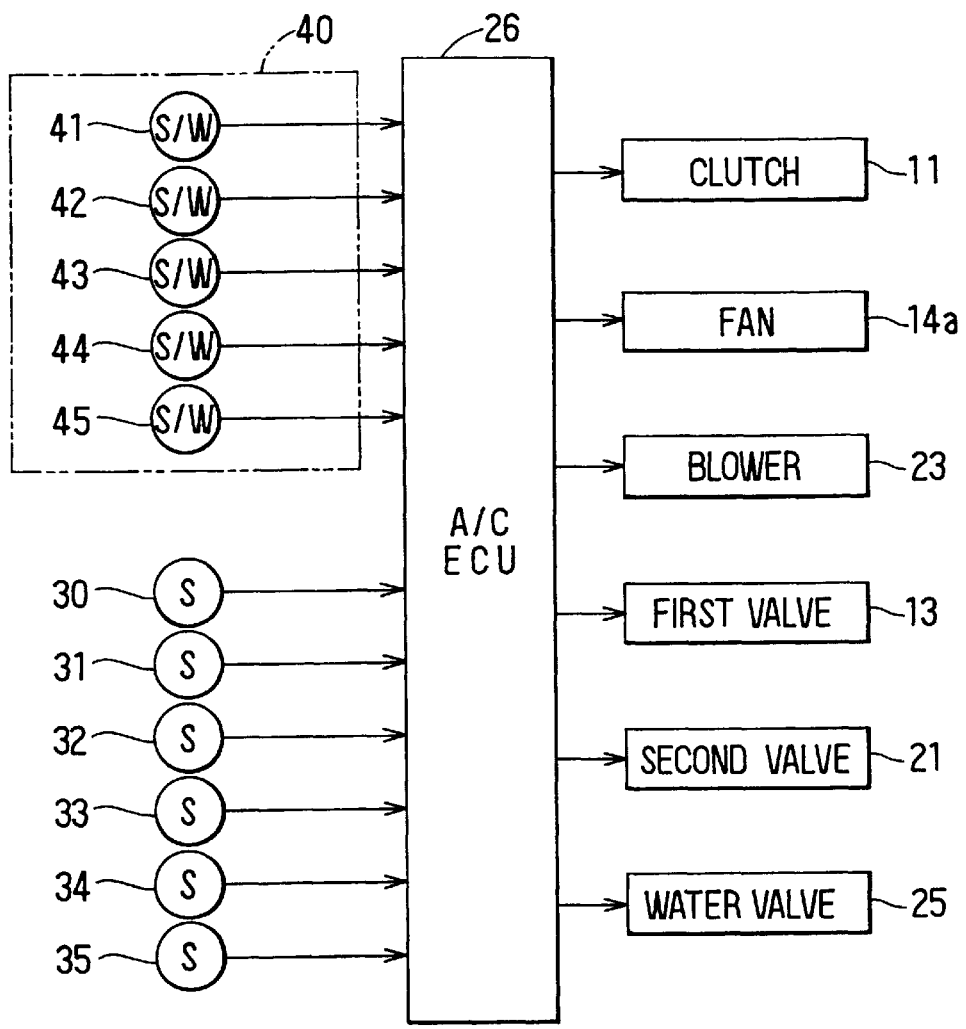
FIG. 2 is a block diagram of an air-conditioning electronic control unit (ECU) according to the first embodiment.

FIG. 2 is a block view of the ECU 26. As shown in FIG. 2, signals from a sensor group are input into the ECU 26. The sensor group includes an inside air temperature sensor 30 for detecting temperature of inside air (i.e., air inside the passenger compartment), an outside air temperature sensor 31 for detecting temperature of outside air (i.e., air outside the passenger compartment), a sunlight sensor 32 for detecting a sunlight amount entering into the passenger compartment; an air temperature sensor 33 for detecting air temperature blown from the evaporator 18, a water temperature sensor 34 for detecting a water temperature of the vehicle engine 12, and a refrigerant pressure sensor 35 for detecting a refrigerant pressure discharged from the compressor 10.

As shown in FIG. 1, the air temperature sensor 33 is disposed in the air conditioning case 22 at an immediately downstream air side of the evaporator 18 to detect the air temperature blown from the evaporator 18. Further, the refrigerant pressure sensor 35 is disposed at the refrigerant discharge side of the compressor 10 to detect a high-pressure side refrigerant pressure Phi discharged from the compressor 10.

Further, operation signals from an operation switch group of an air-conditioning operation panel 40 are also input into the ECU 26. The operation panel 40 is disposed around an instrument panel of the passenger compartment. The operation switch group provided on the operation panel 40 includes: a hot gas switch (i.e., supplementary heating switch) 41 for outputting an operation signal of the heating mode due to the hot-gas bypass; an air outlet mode selecting switch 42 for switching an air outlet mode such as a face mode, a bi-level mode, a foot mode and a defroster mode; a temperature setting switch 43 for setting temperature inside the passenger compartment; an air conditioning switch 44 for setting the cooling mode; and an air amount setting switch 45 for setting an air amount blown from the blower 23.

Next, operation of the refrigerant cycle system according to the first embodiment will be now described. First, when the air conditioning switch 44 is turned on and an operation signal for the cooling mode is output, the first electromagnetic valve 13 is opened and the second electromagnetic valve 21 is closed by the ECU 26. In this case, the electromagnetic clutch 11 is turned on so that the compressor 10 is driven by the vehicle engine 12.

Thus, the cooling mode (normal mode) of the refrigerant cycle system is set. During the cooling mode, refrigerant discharged from the compressor 10 passes through the first electromagnetic valve 13, and flows into the condenser 14 to be cooled and condensed by outside air in the condenser 14. Condensed refrigerant condensed in the condenser 14 flows into the receiver 15, and is separated into gas refrigerant and liquid refrigerant in the receiver 15. Only liquid refrigerant from the receiver 15 is decompressed in the thermal expansion valve 16 to become low-temperature low-pressure gas-liquid refrigerant.

Low-pressure refrigerant from the thermal expansion valve 16 flows into the evaporator 18 after passing through the check valve 17, and is evaporated by absorbing heat from air blown by the blower unit 23. Air cooled by the evaporator 18 is blown into the passenger compartment to cool the passenger compartment. Gas refrigerant evaporated in the evaporator 18 is sucked into the refrigerant suction side of the compressor 10 through the accumulator 19.

On the other hand, when the hot gas switch 41 is turned on in the winter and the operation signal for the heating mode is output, the first electromagnetic valve 13 is closed and the second electromagnetic valve 21 is opened by the ECU 26. Therefore, the hot-gas bypass passage 20 is opened, and the heating mode of the refrigerant cycle system is set. In this case, when the electromagnetic clutch 11 is turned on and the compressor 10 is driven by the vehicle engine 12, high-temperature refrigerant discharged from the compressor 10 is decompressed in the throttle 21a after passing through the second electromagnetic valve 21, and flows into the evaporator 18. The check valve 17 prevents gas refrigerant from the hot-gas bypass passage 20 from flowing toward the thermal expansion valve 16.

During the heating mode of the refrigerant cycle system, because heat from super-heating gas refrigerant decompressed in the throttle 21a is radiated to air blown by the blower 23, air passing through the evaporator 18 is heated. Here, heat quantity radiated from gas refrigerant in the evaporator 18 corresponds to a compression operation amount of the compressor 10. During the heating mode, when the water temperature from the vehicle engine 12 is increased to a predetermined temperature, hot water flows into the heating heat exchanger 24 through the water valve 25, and air from the heating heat exchanger 24 is further heated by the heating heat exchanger 24. Therefore, in this case, air temperature blown into the passenger compartment is increased.

Gas refrigerant radiated in the evaporator 18 is sucked into the compressor 10 through the accumulator 19 to be compressed in the compressor 10. During the heating mode in the winter, generally, outside air is introduced into the air conditioning case 22 for defrosting a windshield.

Figure 3:
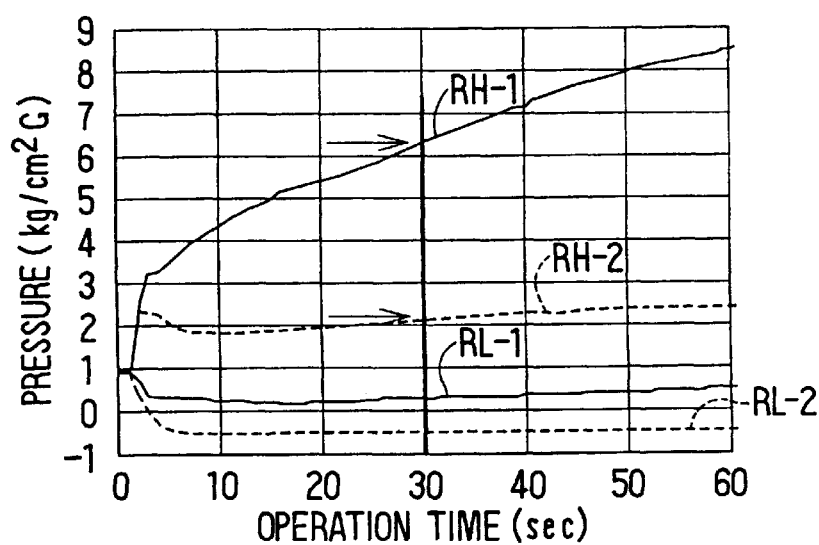
FIG. 3 is a graph showing a relationship between a refrigerant pressure and operation time after starting a heating mode when different refrigerant amounts are used.

Next, the operation of the refrigerant cycle system with a refrigerant shortage during the heating mode will be described. FIG. 3 shows variations of the refrigerant pressure after the heating mode starts when a refrigerant amount is set at 300 g and 50 g. Hear, the refrigerant amount is the sealed refrigerant amount of a hot gas bypass cycle composed of a closed circuit of the refrigerant discharge side of the compressor 10, the hot-gas bypass passage 20, the evaporator 18 and the refrigerant suction side of the compressor 10. In the vehicle air conditioner, a necessary refrigerant amount of the hot gas bypass circuit is approximately equal to or larger than 150 g for obtaining supplementary heating performance. Therefore, when the refrigerant amount is 50g, the refrigerant amount circulating in the hot-gas bypass circuit is insufficient.

In FIG. 3, RH-1 indicates high-pressure side refrigerant pressure when the sealed refrigerant amount is set at 300g, RH-2 indicates high-pressure side refrigerant pressure when the sealed refrigerant amount is set at 50 g, RL-1 indicates low-pressure side refrigerant pressure when the sealed refrigerant amount is set at 300g, and RL-2 indicates low-pressure side refrigerant pressure when the sealed refrigerant amount is set at 50g. Further, in FIG. 3, the outside air temperature is set at −10° C., and the compression rotation speed is set at 1500 rpm.

During the refrigerant shortage (e.g., RH-2, RL-2) when the heating mode is set in the refrigerant cycle system, refrigerant density sucked into the compressor 10 becomes smaller, and both the high-pressure side refrigerant pressure (i.e., discharge refrigerant pressure of the compressor 10) and the low-pressure side refrigerant pressure (i.e., suction refrigerant pressure of the compressor 10) are greatly decreased, as compared with the normal state of the refrigerant amount (RH-1, RL-2, e.g., 300 g).

Thus, during the heating mode due to the hot gas bypass, by detecting a decrease of the high-pressure side refrigerant pressure or the low-pressure side refrigerant pressure, a refrigerant shortage can be determined. When the refrigerant shortage is determined by the ECU 26, the operation of the compressor 10 is stopped so that the compressor 10 is protected.

Figure 4:
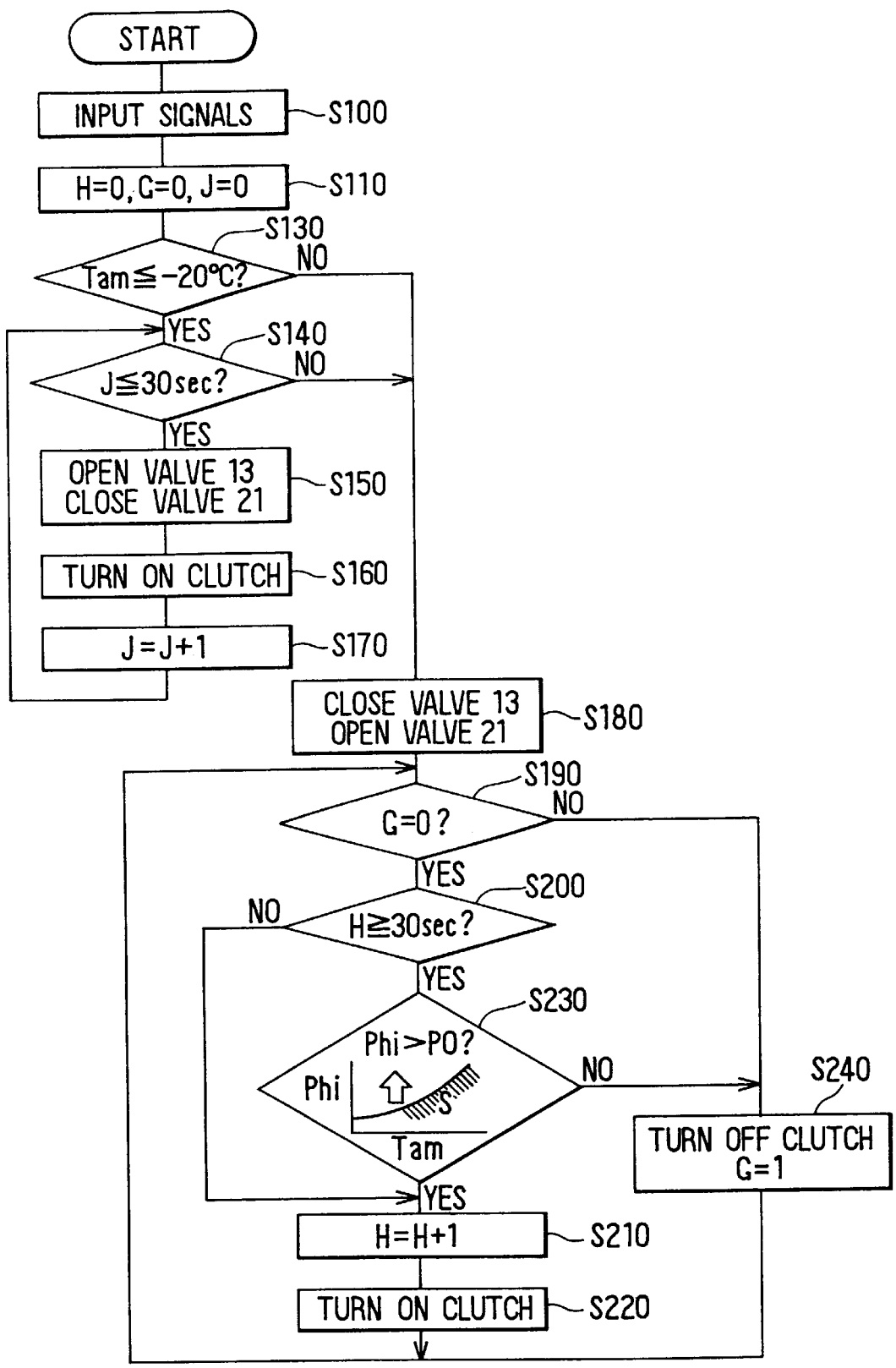
FIG. 4 is a flow diagram of the ECU for determining a refrigerant shortage, according to the first embodiment.

FIG. 4 shows a control routine of the ECU 26 during the heating mode of the refrigerant cycle system. The control routine of FIG. 4 starts, when an ignition switch (not shown) of the vehicle engine 12 is turned on and the hot gas switch 41 of the air-conditioning operation panel 40 is turned on, for example.

At step S100, sensor signals from the sensors 30–35 and operation signals from the operation switches 41–45 of the air-conditioning operation panel 40 are input. Next, at step S110, flag G is set at 0, timer H is set at 0, and timer J is set at 0, so that an initialization is performed.

Next, at step S130, it is determined whether or not outside air temperature Tam is equal to or lower than −20° C. When the outside air temperature Tam is equal to or lower than −20° C., it is further determined whether or not the timer J passes a predetermined time (e.g., 30 seconds). The timer J is set at 0 immediately after the control routine starts. In this case, the first electromagnetic valve 13 is opened and the second electromagnetic valve 21 is closed, so that the cooling mode is set. That is, until the timer J passes through the predetermined time (e.g., 30 sec), the cooling mode is set firstly.

At step S160, the electromagnetic clutch 11 is turned on, and the compressor 10 is operated. Next, at step S170, the timer J is increased by 1 second (i.e., J=J+1). The cooling mode is provisionally set for recovering refrigerant staying in the condenser 14 during a stop of the refrigerant cycle system into the hot-gas bypass circuit. When the outside air temperature Tam is equal to or lower than −20° C., refrigerant saturation pressure relative to the outside air temperature Tam is greatly decreased. In this state, a pressure difference between the refrigerant pressure of the condenser 14 and the suction refrigerant pressure of the compressor 10 becomes little, and it is difficult to recover refrigerant staying in the condenser 14. Therefore, in the first embodiment, the cooling mode is provisionally set at a start time of the refrigerant cycle system, so that refrigerant staying in the condenser 14 can be forcibly recovered when the outside air temperature Tam is equal to or lower than −20° C.

The refrigerant recovering operation is performed until the timer J passes the predetermined time (e.g., 30 seconds). When the predetermined time passes at step S140, the first electromagnetic valve 13 is closed and the second electromagnetic valve 21 is opened at step S180, and the heating mode of the refrigerant cycle system is set.

Next, at step S190, it is determined whether or not the flag G is 0 (i.e., G=0). Because the flag G is set at 0 in the initialization, it is determined whether or not the timer H passes a predetermined time (e.g., 30 seconds) at step S200. The timer H indicates time after the heating mode starts. When the timer H does not pass the predetermined time at step S200, the timer H is changed to be increased by +1 (i.e., H=H+1) at step S210. Next, at step S220, the electromagnetic clutch 11 is turned on, and the compressor 10 is operated. When the timer H passes the predetermined time (e.g., H $\geq$ 30 sec), it is determined whether or not the high-pressure side refrigerant pressure Phi during the heating mode is higher than a set value corresponding to a refrigerant shortage area S.

Figure 5:
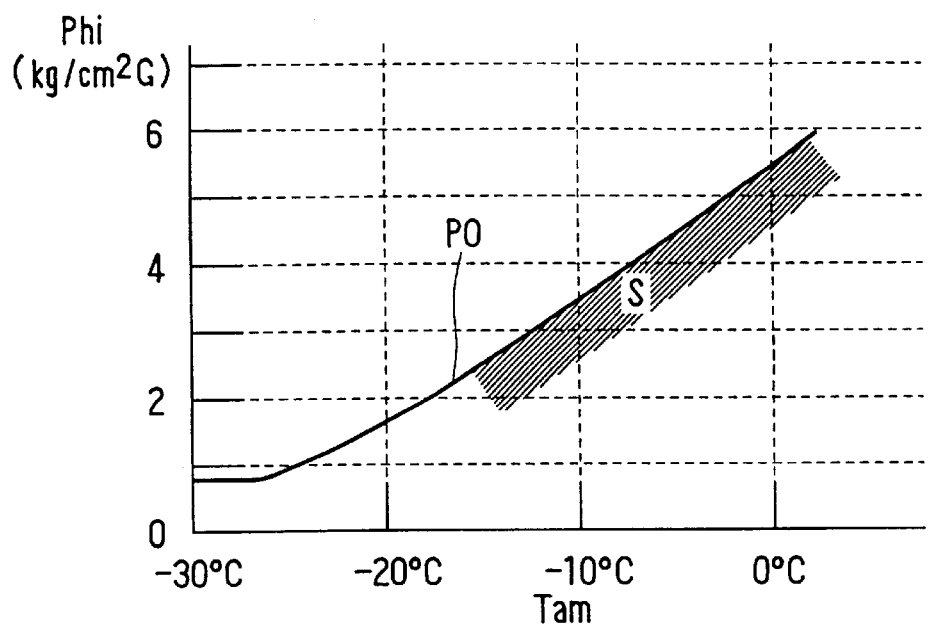
FIG. 5 is a graph showing a refrigerant shortage area at a high-pressure refrigerant side according to the first embodiment.

The refrigerant shortage area S is determined based on the relationship between the outside air temperature Tam and the high-pressure side refrigerant pressure Phi, shown in FIG. 5. In FIG. 5, the line PO indicates a boundary line between a refrigerant shortage area S and a normal area. The map of FIG. 5 is beforehand stored in ROM of the micro-computer of the ECU 26. The compressor 10 and the high-pressure pipe portions of the refrigerant cycle system are generally disposed in the engine compartment of the vehicle, and are exposed by the outside air. Therefore, even when the refrigerant amount is in a normal area, the boundary line PO is decreased in accordance with a decrease of outside air temperature.

When it is determined that the high-pressure side refrigerant pressure Phi is in the normal state (i.e., Phi >PO) at step S230, the turn-on state of the electromagnetic clutch 11 is continuously maintained and the compressor 10 is continuously operated. On the other hand, when it is determined that the high-pressure side refrigerant pressure Phi is in the refrigerant shortage area S (i.e., Phi <PO) at step S230, the electromagnetic clutch 11 is turned off and the operation of the compressor 10 is stopped at step S240.

Further, at step S240, the flag G is set at 1. Thereafter, in this case, the control program is directly moved from step S190 to step S240, and the stop state of the compressor 10 is maintained.

According to the first embodiment of the present invention, when the refrigerant shortage due to the refrigerant leakage to an outside is generated, the operation of the compressor 10 is stopped. Therefore, it can prevent the compressor 10 from operating with a lubrication oil shortage, and the compressor 10 is accurately protected.

Further, according to the first embodiment of the present invention, after the predetermined time passes after the heating mode starts at step S200, the refrigerant shortage is determined based on the high-pressure side refrigerant pressure Phi at step S230. Therefore, the refrigerant shortage of the refrigerant cycle system is accurately determined.

As shown in FIG. 3, at an operation time immediately after the start operation of the heating mode, a pressure difference between the high-pressure side refrigerant pressures (or between the low-pressure side refrigerant pressures) during the normal refrigerant state and during the refrigerant shortage state is small. However, after the predetermined time (e.g., 30 sec) passes after the start operation of the heating mode, the pressure difference between the high-pressure side refrigerant pressures (or between the low-pressure side refrigerant pressures) during the normal refrigerant state and during the refrigerant shortage state becomes larger.

According to the first embodiment of the present invention, after the predetermined time passes after the heating mode starts, the refrigerant shortage is determined based on the high-pressure side refrigerant pressure Phi, and the refrigerant shortage is accurately determined.

Figure 6:
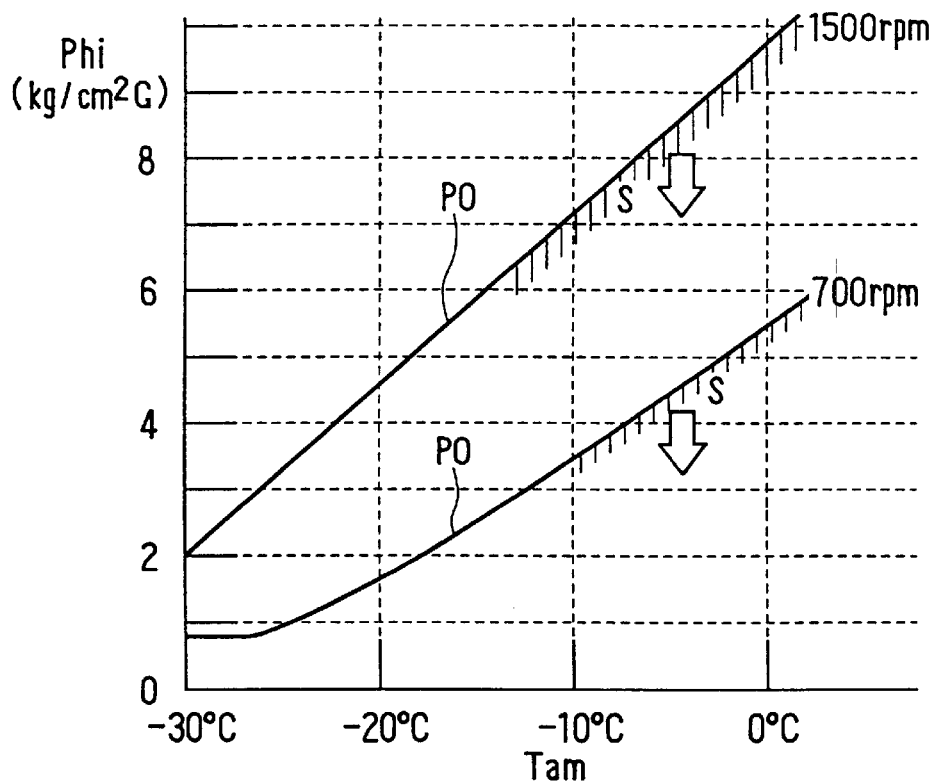
FIG. 6 is a graph showing a refrigerant shortage area in a high-pressure refrigerant side of a refrigerant cycle system according to a second preferred embodiment of the present invention.

A second preferred embodiment of the present invention will be now described with reference to FIG. 6. The high-pressure side refrigerant pressure Phi is decreased in accordance with a decrease of the rotation speed of the compressor 10. Therefore, in the second embodiment, the boundary line PO of the high-pressure side refrigerant pressure Phi between during the normal refrigerant state and during the refrigerant shortage state is corrected to be decreased as a decrease of the rotation speed of the compressor 10. Thus, even when the outside air temperature Tam and the rotation speed of the compressor 10 are changed, the refrigerant shortage is accurately determined. For example, as shown in FIG. 6, when the compressor rotation speed is changed from 1500 rpm to 700 rpm, the boundary line PO is corrected to be decreased.

Further, when the air amount blown toward the evaporator 18 is increased during the heating mode, the heat radiating amount in the evaporator 18 is increased, and the high-pressure side refrigerant pressure Phi is decreased. Therefore, the boundary line PO of the high-pressure side refrigerant pressure Phi between during the normal refrigerant state and during the refrigerant shortage state may be corrected to be decreased as an air amount blown into the evaporator 18 is increased.

Figure 7:
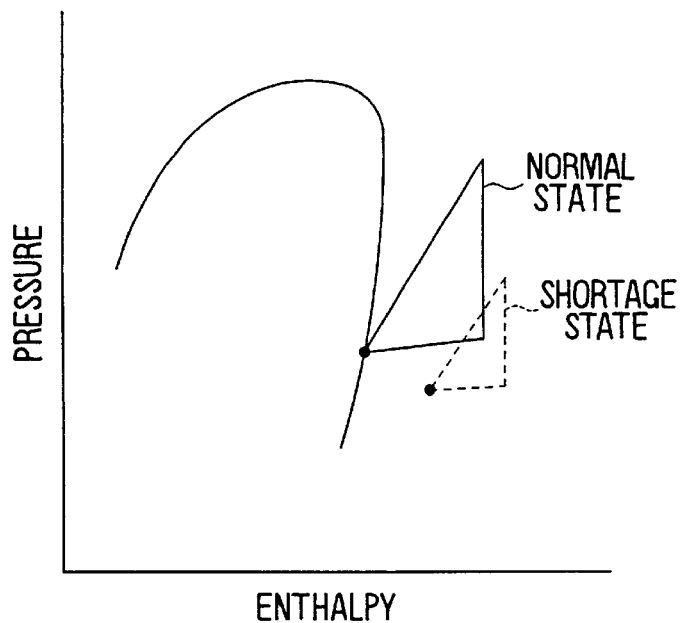
FIG. 7 is a Mollier diagram of refrigerant R134a of a refrigerant cycle system, for determining a refrigerant shortage, according to a third preferred embodiment of the present invention.

A third preferred embodiment of the present invention will be now described with reference to FIGS. 7–9. FIG. 7 is a Mollier diagram of refrigerant R134a of a refrigerant cycle system according to the third embodiment. During the refrigerant shortage state, the super-heating degree of refrigerant is increased as compared with that during normal state.

Figure 8:
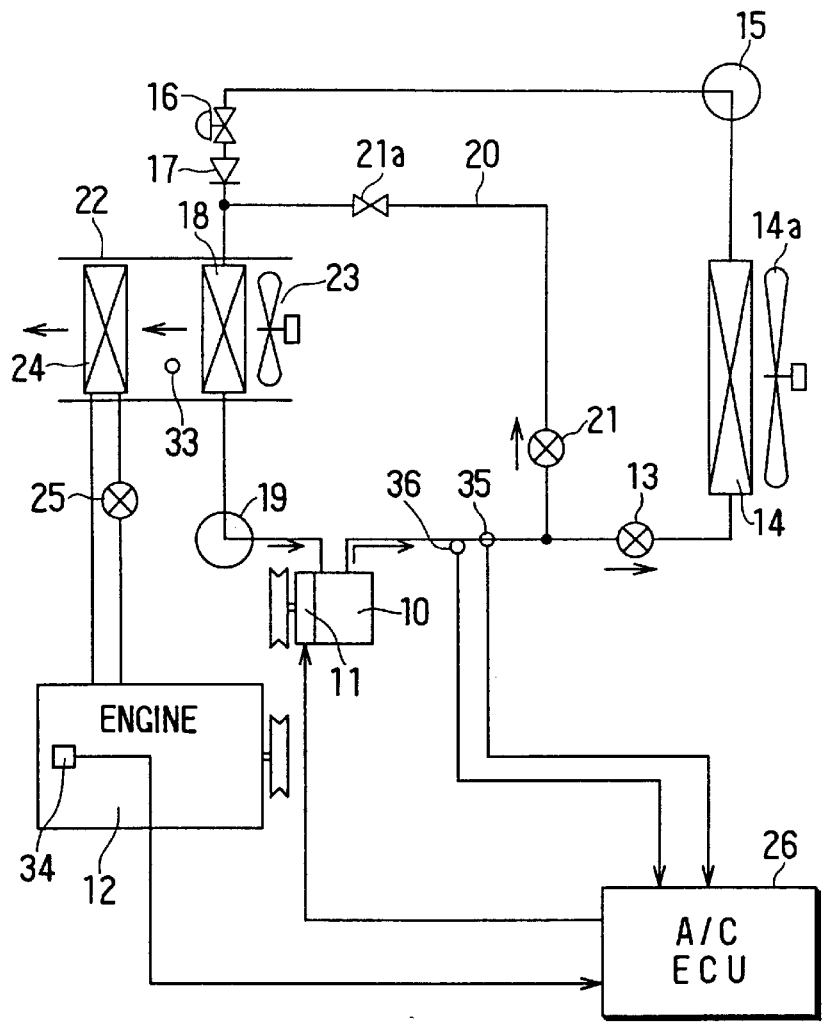
FIG. 8 is schematic view showing the refrigerant cycle system according to the third embodiment.

According to the third embodiment of the present invention, as shown in FIG. 8, a refrigerant temperature sensor 36 for detecting the super-heating degree of high-pressure side refrigerant is further disposed at a refrigerant discharge side of the compressor 10, and the super-heating degree SH of the high-pressure side refrigerant is calculated based on the refrigerant temperature detected by the refrigerant temperature sensor 36 and the refrigerant pressure detected by the refrigerant pressure sensor 35.

Figure 9:
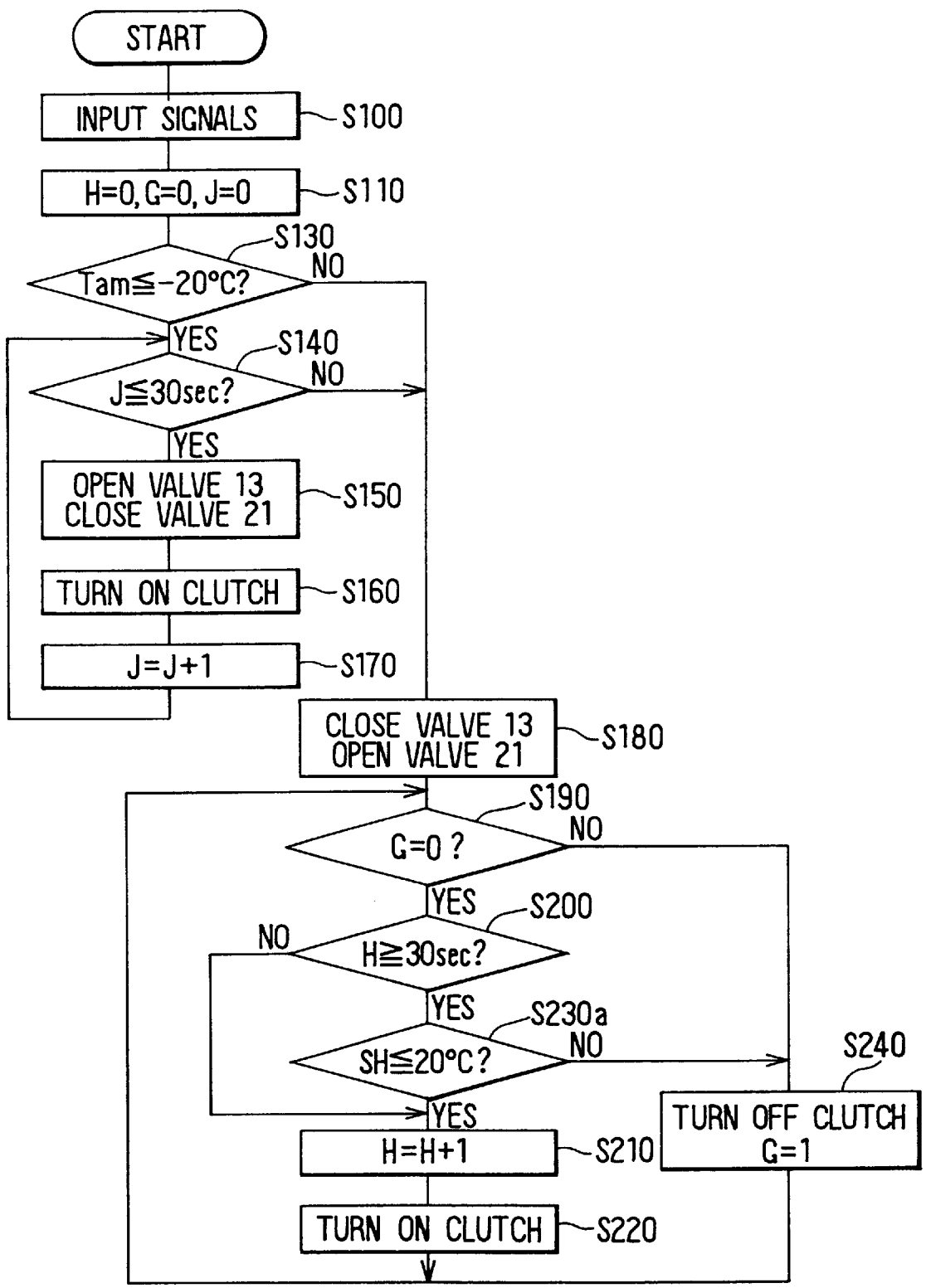
FIG. 9 is a flow diagram of an electronic control unit (ECU) for determining a refrigerant shortage, according to the third embodiment.

FIG. 9 shows a control routine of the ECU 26 of a refrigerant cycle system according to the third embodiment. As shown in FIG. 9, at step S230a corresponding to step S230 in FIG. 4, it is determined whether or not the super-heating degree SH of the high-pressure side refrigerant is equal to or smaller than a predetermined degree (e.g., 20° C.). When the super-heating degree SH of the high-pressure side refrigerant is larger than the predetermined degree, the refrigerant shortage is determined, and the electromagnetic clutch 11 is turned off so that the operation of the compressor 10 is stopped at step S240. In FIG. 9, the other steps are similar to those in FIG. 4.

In the above-described third embodiment of the present invention, the super-heating degree SH of the high-pressure side refrigerant is calculated based on the refrigerant temperature detected by the refrigerant temperature sensor 36 and the refrigerant pressure detected by the refrigerant pressure sensor 35. However, as shown in FIG. 7, during the refrigerant shortage state, the super-heating degree SH of the low-pressure side refrigerant is also increased as compared with during the normal state. Therefore, in the third embodiment, the super-heating degree SH of the low-pressure side refrigerant at a position such as the refrigerant inlet and outlet of the evaporator 18, the bottom side of the accumulator 19 and the refrigerant suction side of the compressor 10 may be detected, and the refrigerant shortage may be determined based on the super-heating degree SH of the low-pressure side refrigerant.

Figure 10:
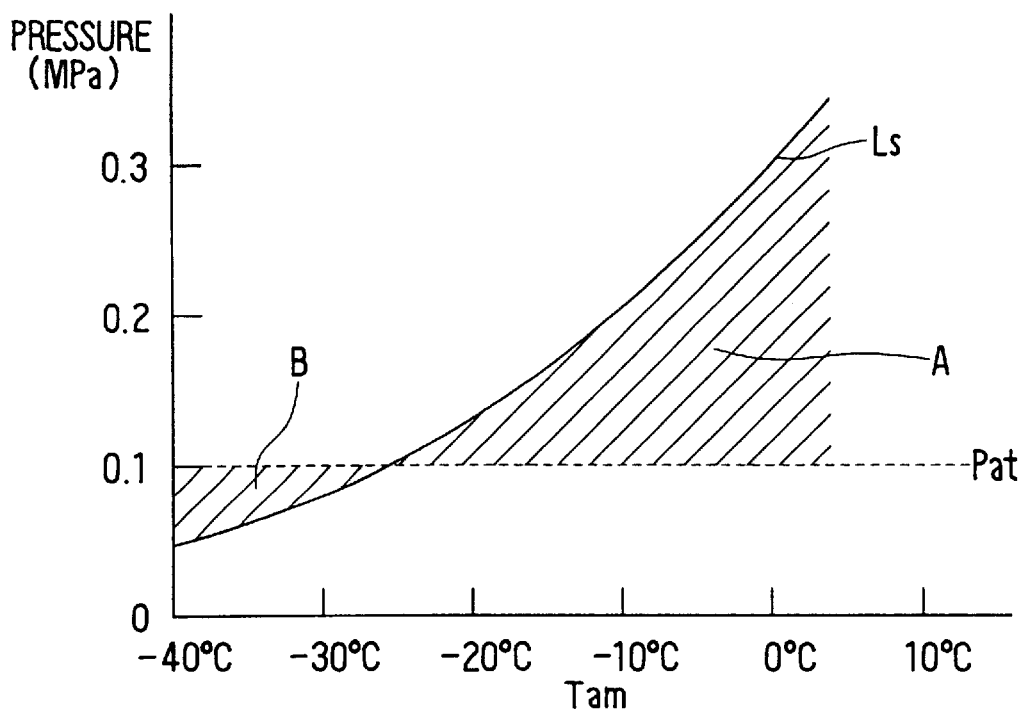
FIG. 10 is a graph of a saturation refrigerant line Ls, showing a refrigerant shortage area according to a fourth preferred embodiment of the present invention.

A fourth preferred embodiment of the present invention will be now described with reference to FIG. 10. In FIG. 10, line Ls indicates a saturation line of refrigerant R134a. When the refrigerant amount of the refrigerant cycle is greatly reduced due to a refrigerant leakage to the outside, the liquid refrigerant becomes smaller in the refrigerant cycle system, and refrigerant pressure before the starting operation of the refrigerant cycle system is not increased to the saturation refrigerant pressure relative to outside air temperature Tam as shown by the slanting line portion A.

The slanting line portion A is an area in which the saturation refrigerant pressure relative to outside air temperature Tam is higher than the atmosphere pressure Pat (outside air pressure). On the other hand, the slanting line portion B is an area in which the saturation refrigerant pressure relative to outside air temperature Tam is lower than the atmosphere pressure Pat. When the saturation refrigerant pressure relative to outside air temperature Tam is lower than the atmosphere pressure Pat, outside air flows into the refrigerant cycle system from refrigerant leakage points. Therefore, the refrigerant pressure of the refrigerant cycle system is not set lower than the atmosphere pressure Pat.

The slanting line portion A is an abnormal area when the saturation refrigerant pressure relative to outside air temperature Tam is higher than the atmosphere pressure Pat. On the other hand, the slanting line portion B is an abnormal area when the saturation pressure relative to outside air temperature Tam is lower than the atmosphere pressure Pat. Thus, in the fourth embodiment, when it is determined that refrigerant pressure within refrigerant cycle system before the start operation of the refrigerant cycle system is in the abnormal areas A, B, the refrigerant shortage is determined before the start operation of the refrigerant cycle system. Further, in the fourth embodiment, when the refrigerant pressure before the start operation of the heating mode is lower than any one of the saturation refrigerant line Ls and the atmosphere pressure Pat, the refrigerant shortage can be determined.

In the fourth embodiment, similar to step S230 in FIG. 4 of the first embodiment, the refrigerant shortage may be determined based on the refrigerant pressure before the start operation of the refrigerant cycle system. In the fourth embodiment, the other portions are similar to those in the first embodiment.

Figure 11:
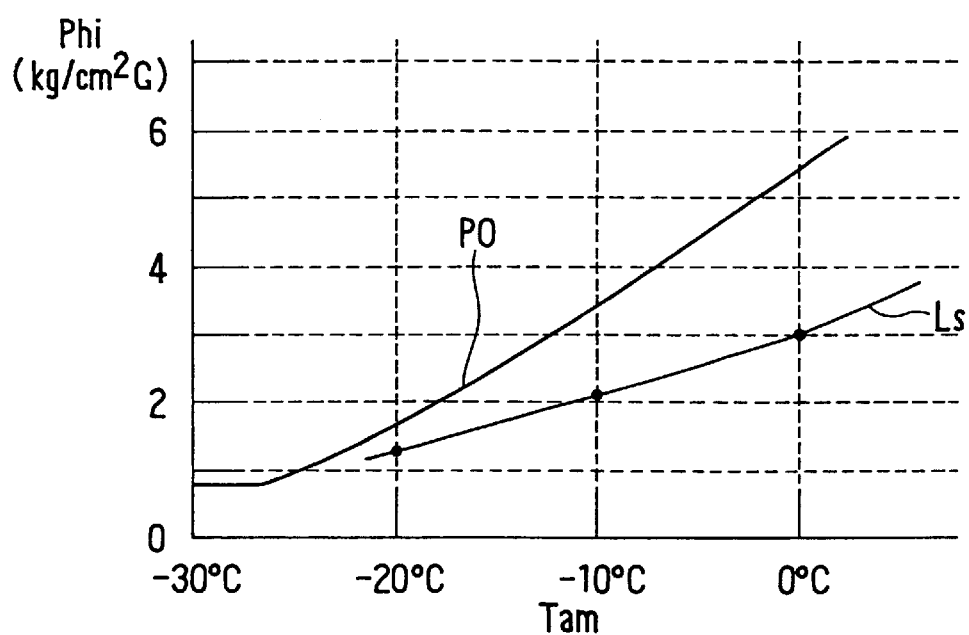
FIG. 11 is a graph showing a saturation refrigerant line Ls and a boundary line PO between a refrigerant shortage area and a normal area according to a fifth preferred embodiment of the present invention.

A fifth preferred embodiment of the present invention will be now described with reference to FIG. 11. In the fifth embodiment, the boundary line PO between a refrigerant shortage area S and the normal area described in the first embodiment can be set larger than the saturation refrigerant line Ls by a predetermined pressure at an outside air temperature, as shown in FIG. 11. The predetermined pressure between the boundary line PO and the saturation refrigerant line Ls is changed in accordance with the outside air temperature Tam. In the fifth embodiment, at step S230 in FIG. 4, the refrigerant shortage can be determined, when the refrigerant pressure during a stop of the heating mode is lower than a pre-set value (e.g., PO) which is larger than the saturation refrigerant pressure relative to the outside air temperature Tam by a predetermined pressure.

Although the present invention has been fully described in connection with the preferred embodiments thereof with reference to the accompanying drawings, it is to be noted that various changes and modifications will become apparent to those skilled in the art.

For example, in the above-described first embodiment as shown in FIG. 1, the receiver 15 and the thermal expansion valve 16 are disposed in the refrigerant cycle of the cooling mode. However, in this case, the receiver 15 may be not provided, and a fixed throttle may be used instead of the thermal expansion valve 16. Further, instead of both the first and second electromagnetic valves 13, 20, a single switching unit may be used.

In the above-described first embodiment as shown in FIG. 2, the hot gas switch 41 for setting the heating mode is provided in the air-conditioning operation panel 40. However, the heating mode may be set by the other switch without using the hot gas switch 41. For example, in a vehicle having a manual operation switch for performing an idling-up control of the vehicle engine, the heating mode due to the hot-gas bypass may be started with a turn-on operation of the manual operation switch.

Further, in a vehicle where a necessary condition of a heating unit of the vehicle engine is determined by an engine electronic control unit and the heating unit of the vehicle engine is automatically operated, the heating mode due to the hot-gas bypass is automatically started based on a heating signal from the engine electronic control unit.

Such changes and modifications are to be understood as being within the scope of the present invention as defined by the appended claims.

What is claimed is:

1. A refrigerant cycle system for selectively setting a cooling mode and a heating mode, the refrigerant cycle system comprising:

a compressor for compressing and discharging refrigerant;

a first heat exchanger for condensing gas refrigerant discharged from said compressor;

a first decompression unit for pressure-reducing refrigerant condensed in said condenser;

a second heat exchanger in which refrigerant from said first decompression unit is evaporated during the cooling mode;

a refrigerant pipe for defining a hot-gas bypass passage through which gas refrigerant discharged from said compressor is directly introduced into said second heat exchanger while bypassing said first heat exchanger and said first decompression unit during the heating mode;

a second decompression unit disposed in said hot-gas bypass passage, for pressure-reducing refrigerant discharged from said compressor during said heating mode;

a detecting unit for detecting a physical amount indicating a state of refrigerant flowing through said hot-gas bypass passage during the heating mode; and a control unit for controlling operation of said compressor, wherein said control unit determines a refrigerant shortage based on said physical amount, and stops the operation of said compressor when the refrigerant shortage is determined.

2. The refrigerant cycle system according to claim 1, wherein:

said physical amount is a refrigerant pressure during the heating mode; and said control unit determines the refrigerant shortage when the refrigerant pressure during the heating mode becomes a value corresponding to a refrigerant shortage area which is set at least based on an outside air temperature and the refrigerant pressure.

3. The refrigerant cycle system according to claim 2, wherein said control unit corrects said refrigerant shortage area based on a rotation speed of said compressor.

4. The refrigerant cycle system according to claim 1, wherein:

said detecting unit detects a refrigerant pressure discharged from said compressor during the heating mode; and said control unit determines said refrigerant shortage based on the refrigerant pressure detected by said detecting unit and the outside air temperature.

5. The refrigerant cycle system according to claim 1, wherein:

said physical amount is a super-heating degree of refrigerant during the heating mode; and said control unit determines said refrigerant shortage when said super-heating degree is larger than a set value.

6. The refrigerant cycle system according to claim 5, wherein said control unit calculates said super-heating degree based on a refrigerant pressure and a refrigerant temperature discharged from said compressor.

7. The refrigerant cycle system according to claim 1, wherein:

said physical amount is a refrigerant pressure during a stop state of the heating mode; and said control unit determines said refrigerant shortage when the refrigerant pressure during the stop state of the heating mode is lower than a set pressure, which is higher than a saturation refrigerant pressure relative to an outside air temperature by a predetermined pressure.

8. The refrigerant cycle system according to claim 1, wherein said control unit performs a determination of said refrigerant shortage after a predetermined time passes after a start operation of the heating mode.

9. The refrigerant cycle system according to claim 1, wherein:

said physical amount is a refrigerant pressure during a stop state of the heating mode; and said control unit determines said refrigerant shortage when the refrigerant pressure during the stop state of the heating mode is in an abnormal area of a saturation refrigerant pressure relative to an outside air temperature.

10. The refrigerant cycle system according to claim 9, wherein:

said physical amount is a refrigerant pressure during the stop state of heating mode; and said control unit determines said refrigerant shortage when the refrigerant pressure during the stop state of the heating mode is lower than any one of said saturation refrigerant pressure relative to an outside air temperature, and an outside air pressure.

11. The refrigerant cycle system according to claim 1, further comprising:

a switching unit for switching a communication between a discharge port of said compressor and an inlet of said first heat exchanger, and a communication between said discharge port of said compressor and an inlet of said second heat exchanger.

* * * * *